United States Patent
Byren et al.

(10) Patent No.: US 6,567,452 B2
(45) Date of Patent: May 20, 2003

(54) SYSTEM AND METHOD FOR PUMPING A SLAB LASER

(75) Inventors: Robert W. Byren, Hermosa Beach, CA (US); David F. Rock, Torrance, CA (US); Cheng-Chih Tsai, Cerritos, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/862,956

(22) Filed: May 22, 2001

(65) Prior Publication Data

US 2003/0031226 A1 Feb. 13, 2003

(51) Int. Cl.⁷ .................................................. H01S 3/14
(52) U.S. Cl. .............................. 372/66; 372/34; 372/72
(58) Field of Search .......................... 250/352; 372/34, 372/72; 349/64

(56) References Cited

U.S. PATENT DOCUMENTS

| 5,225,931 A | * | 7/1993 | Stavroudis | ................... 250/352 |
| 5,974,061 A | * | 10/1999 | Byren et al. | .................. 372/34 |
| 6,014,391 A | | 1/2000 | Byren | |
| 6,055,260 A | | 4/2000 | Bently et al. | ................. 372/72 |
| 6,130,730 A | * | 10/2000 | Jannson et al. | ............... 349/64 |

FOREIGN PATENT DOCUMENTS

GB        2 021 807        12/1979

* cited by examiner

*Primary Examiner*—Paul Ip
*Assistant Examiner*—Hung T Vy
(74) *Attorney, Agent, or Firm*—Colin M. Raufer; Leonard A. Alkov; Glenn H. Lenzen, Jr.

(57) ABSTRACT

A concentrator including a volume of at least partially transmissive material and a plurality of facets disposed at at least one surface thereof. Each of the facets is disposed at a position dependent angle relative to the surface effective to cause an internal reflection of energy applied to the layer whereby the density of the applied energy varies as a function of position. In the illustrative implementation, the volume is an active medium, i.e., a slab. The slab has substantially parallel, planar upper and lower surfaces and first and second edges therebetween. A plurality of cladding layers are disposed on the upper and lower surfaces of the slab. The facets are provided in the cladding layers on the upper and lower surfaces of the slab and angled as a function of distance relative to the first or the second edge. The facets provide a Fresnel reflecting surface or a binary optic surface.

12 Claims, 3 Drawing Sheets

SYSTEM AND METHOD FOR PUMPING A SLAB LASER

BACKGROUND OF THE INVENTION

1. Field of the Invention

The present invention relates to lasers. More specifically, the present invention relates to systems and methods for pumping solid-state slab lasers.

2. Description of the Related Art

Doped-insulator slab lasers are solid state lasers that are used in a variety of applications requiring moderate to high optical output power. The slab lasing material is typically comprised of a host crystal doped with an ion, such as, for example, ytterbium doped yttrium aluminum garnet (Yb:YAG). High power slab lasers employing lasing media with high aspect ratio slab configurations have traditionally been optically pumped through the broad slab faces with one or more linear flashlamps and have been cooled either by forced convection or conduction through the same faces. (Pumping is the process by which an active (lasing) medium is excited to achieve a population inversion. The population inversion is a condition by which energy is stored in the medium with sufficient gain to cause the medium to lase. See *Solid-State Laser Engineering, Second Edition* by Walter Kocchner, published 1988 by Springer-Verlag, Berlin, Germany.)

Face pumping has been necessary due to the low brightness of the flashlamp pumping sources, which have precluded pumping through the smaller area ends and edges of the slab. Face cooling is advantageous in high aspect slab lasers to minimize the conduction path through the lasing medium for thermal energy produced by intrinsic and extrinsic nonradiative processes within the medium (quantum defect, quenching, excited state absorption and/or up conversion). Minimizing the thermal conduction path is important to minimize the average temperature and temperature gradient within the lasing medium, as is discussed later. Because they require optical pumping and cooling through the same slab faces, the traditional flashlamp-pumped slab lasers are necessarily complicated in their design, requiring optically transparent cooling means.

More modern slab lasers are optically pumped by narrow band, high brightness laser diode arrays. The higher brightness of these laser diode pump sources relative to flashlamps allows a high aspect ratio slab to be pumped either through the narrow edges of the slab in directions generally transverse to the laser beam or through the narrow ends of the slab in directions generally collinear with the laser beam. Edge and end pumping of the slab allows the faces to be cooled without constraining the cooling system to also transmit the pump beam into the slab, thereby simplifying the design. The pumping configuration that results in the optimum absorption and distribution of pump energy in the lasing medium is preferred.

A configuration capable of achieving both high absorption and uniform distribution of pump energy in an edge-pumped geometry is described in commonly assigned patents entitled Laser Pump Cavity Apparatus with Integral Connector and Method, issued Apr. 25, 2000 to R. W. Byren et al., U.S. Pat. No. 6,055,260 (Attorney Reference No. PD 970064 and referred to hereinafter as the '064 application) and Laser Pump Cavity Apparatus with Improved Thermal Lensing Control, Cooling, and Fracture Strength and Method, issued Oct. 26, 1999 to R. W. Byren et al., U.S. Pat. No. 5.974,061 (Attorney Reference No. PD 970226 and referred to hereinafter as the '226 application), the teachings of both of which are incorporated herein by reference.

The approach described in the '064 application requires a cladding layer formed in a hyperbolic cylindrical shape that is thicker at the edge of the slab than in the center to obtain the proper optical concentrator performance. If the outer surface of the cladding layer is cooled to a constant heat sink temperature, the difference in thermal conductance across the width of the slab due to the change in the cladding thickness produces a nonuniform temperature gradient within the slab. This, in turn, introduces nonuniform thermal lensing and stress birefringence, which are difficult to compensate.

In addition to improving pump efficiency and uniformity, it is essential to efficiently remove the large amount of heat that is generated within the lasing medium.

An increase in the operating temperature within the lasing medium reduces the population inversion that can be achieved for a given level of pumping, thereby reducing efficiency. Reducing the operating temperature of the laser increases the gain and extraction efficiency. More specifically, reducing the operating temperature increases the stimulated emission cross-section of the active lasing medium. This lowers the saturation fluence of the active lasing region, which makes it easier to extract the stored energy for gain-switched and Q-switched systems, without damaging the optical coatings at the exit surfaces of the bulk lasing material. Similarly, reducing the temperature also lowers the saturation intensity, which makes it easier to extract power for continuous and high pulse rate systems without optical damage.

Temperature gradients cause mechanical stress within the lasing medium. When the medium is stressed, the crystal becomes birefringent, and energy in the laser beam if polarized in a direction that is neither along nor orthogonal to the stress gradient will be converted from the desired polarization to an undesired polarization as the beam propagates along the beam axis through the crystal. This induced birefringence is undesirable for many applications. For example, when the crystal faces are cut at the Brewster angle to extract energy of a desired polarization, energy converted to an orthogonal polarization will be internally reflected, resulting in a loss of output efficiency.

As another example, in a typical multi-pass master oscillator power amplifier laser system that uses a straightforward polarizer and 90° polarization rotation means to separate the master oscillator input beam from the amplified output beam, depolarization of the beam due to thermal stress induced birefringence in the amplifier will cause a portion of the output beam to feed back into the master oscillator, potentially damaging the oscillator components, reducing the output power, and imprinting on the output beam a nonuniform intensity profile which adversely affects beam quality. It is therefore desirable to maintain a one-dimensional temperature gradient within the slab and orient the polarization of the beam to be collinear with or orthogonal to this gradient in order to avoid depolarization due to thermal stress birefringence. Temperature gradients also cause refraction or bending of the laser beam as it enters, propagates through, and exits the lasing medium. Physical distortion of the lasing medium due to nonuniform thermal expansion produces a lensing effect at the entrance and exit surfaces of the lasing medium. The index of refraction of the medium, which is a function of both the temperature and stress within the medium, varies across the beam producing graded-index lensing within the medium. If the temperature gradient is one dimensional within the slab, i.e. isotherms are parallel to slab faces, the thermal lensing effects can be compensated by means available in the present art. For example, conventional cylindrical lenses can be used to provide a first order correction. The beam can also be guided by total internal reflection at the faces, as described in the above-mentioned co-pending applications, minimizing the beam spreading within the slab. It is, therefore, desirable to maintain a one-dimensional temperature gradient within the slab in order to permit thermal lensing compensation by available methods.

In side-pumped laser cavity configurations, heat is removed from the lasing medium by cooling mechanisms applied to the broad faces of the slab. Prior art methods for cooling the broad slab faces include air cooling, liquid cooling systems (forced convection and impingement) and conductive cooling through metal heat sinks. Air cooling is limited to lower power lasers due to relatively poor thermal transfer. Liquid cooling requires careful sealing arrangements to prevent leakage that would contaminate the diode pump arrays and associated relay optics and cause optical damage to surfaces exposed to the laser beam.

Similarly, the performance of prior art methods that utilize direct contact of metal heat sinks to the solid state pump cavity medium has been less than desirable. Differences between the thermal conductivity and thermal expansion coefficients of the metal and solid-state pump cavity medium result in inadequate thermal transfer rates and significant mechanical stress. The above-mentioned co-pending applications describe a composite slab structure with top and bottom cladding layers that are diffusion bonded to the slab-shaped active lasing region. These cladding layers are shaped having outer cylindrical optical focusing surfaces which concentrate the pumplight entering from the edge of the composite slab, thereby providing efficient and uniform pumping across the slab.

Because the thickness of the cladding layers varies across the slab, direct cooling of the slab through the outer cylindrical focusing surfaces, either by liquid or solid conductive means, wherein the cooling surface is maintained at a constant temperature, produces a non-uniform temperature gradient across the active lasing region resulting in a non-uniform thermal lensing and birefringence condition which is difficult to correct externally.

Edge cladding regions may be used to improve the optical performance of the concentrator adding to the efficiency and uniformity of pumping. These edge cladding regions, however, provide a thermal conduction path through the edges of the slab which exacerbates the non-uniform temperature gradient near the ends of the slab active lasing region.

Thus, there was a need for improved methods and apparatus for cooling a slab laser and controlling the direction of heat flow within the lasing medium to increase operating efficiency and minimize thermally-induced birefringence and lensing. This need was addressed by U.S. Pat. No. 6,014,391 issued Jan. 11, 2000 to R. W. Byren and entitled Thermally Improved Slab Laser Pump Cavity Apparatus. with Integral Concentrator and Method of Making Same (Attorney Reference Number PD 970508 and referred to hereinafter as the '508 application), the teachings of which are incorporated herein by reference. This application provides a solution to the temperature nonuniformity problem by adding thermal resistance between the slab and the heat sink through a variable thickness compliant thermal interface layer between the cladding surface and the cold plate heat sink.

A problem arises with this approach at high pumping levels in that the total temperature drop across the cladding and thermal interface layers can be quite large, resulting in high temperatures within the active lasing region of the slab. For quasi-four level laser media such as Yb:YAG, the gain (stimulated emission cross-section) of the medium decreases rapidly with temperature due to thermal population of the lower lasing level, degrading the performance of the laser. Also, thermal conductivity of materials such as YAG decreases with temperature, exacerbating the temperature rise problem.

Hence, a need remains in the art for a system or method for improving the performance of pumping arrangements for slab lasers. More specifically, a need remains in the art for a system or method for reducing the temperature drop across the cladding layers of side and end pumped high energy slab lasers to improve the thermal conductivity between the lasing medium and the heat sink thereof.

SUMMARY OF THE INVENTION

The need in the art is addressed by the concentrator and method of the present invention. In a most general implementation, the inventive concentrator includes a volume of at least partially transmissive material and a plurality of facets disposed at at least one surface of the material. Each of the facets is disposed at a position-dependent angle relative to the surface effective to cause an internal reflection of energy applied to the layer whereby the density of the applied energy varies as a function of position.

In the illustrative implementation, the volume is an active medium, i.e., a slab. The slab has substantially parallel, planar upper and lower surfaces and first and second edges therebetween. A plurality of cladding layers are disposed on the upper and lower surfaces of the slab. The facets are provided in the cladding layers on the upper and lower surfaces of the slab and angled as a function of distance relative to the first or the second edge. The facets provide a Fresnel reflecting surface or a binary optic surface and the facet angles as a function of distance relative to the slab edge are approximately:

$$\phi(x) = 0.5\alpha_m^2 t\, x_{max}(1-x/x_{max})/[1-\alpha_m^2 x_{max}^2(1-x/x_{max})^2]$$

where:
$\alpha_m$=bulk absorption coefficient (cm$^{-1}$)=$\alpha_m$=cos $\theta_0/x_{max}$;
$\theta_0$=internal injection angle (radians);
$\phi(x)$=facet angle as a function of distance from slab edge (radians);
t=slab thickness (cm); and
$x_{max}$=point at which 100% of pumplight is absorbed, i.e., center of slab (cm).

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The teachings of the present invention are disclosed with initial reference to the prior art.

Figure 1:
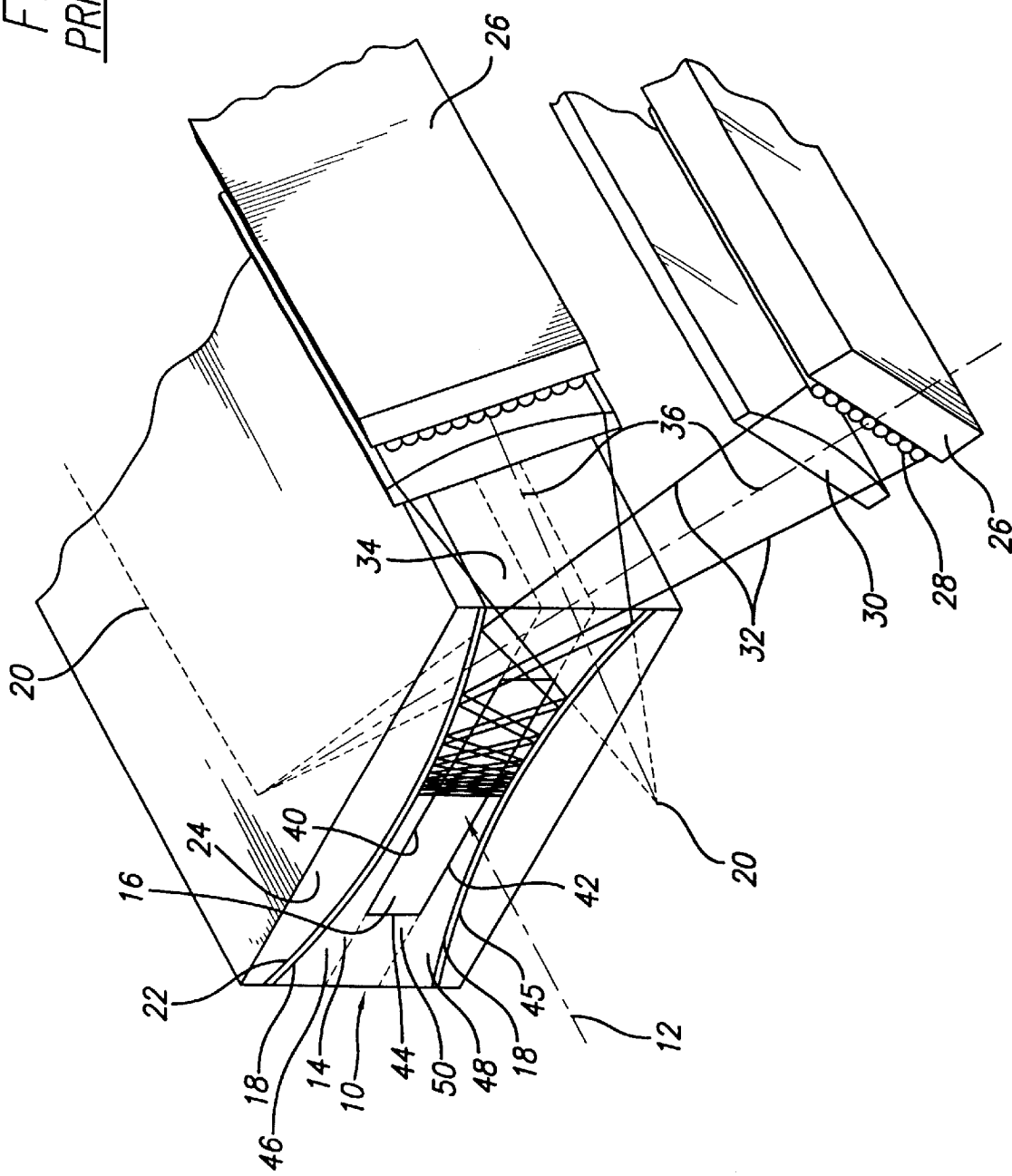
FIG. 1 is a schematic perspective view of a slab laser pump cavity with integral concentrator implemented in accordance with the teachings of the above-reference '064 application.

FIG. 1 is a schematic perspective view of a slab laser pump cavity with integral concentrator implemented in accordance with the teachings of the above-reference '064 application. The apparatus is an edge-pumped configuration which employs a slab-shaped laser pump cavity 10 preferably constructed by. diffusion bonding an undoped cladding layer 14 of laser host crystal, such as undoped YAG, around a doped laser crystal active lasing region 16, made of high-aspect ratio slab of similar type, such as YAG, which has been doped with an active ion, such as ytterbium. The undoped cladding layer 14 has a top cladding layer 46 with a concave, upwardly facing outer cylindrical focusing surface 18, a bottom clading layer 48 having a concave, downwardly facing outer cylindrical focusing surface 18 and a pair of edge cladding layers 50. The active lasing region 16 preferably has a rectangular cross-section and is pumped by laser diode arrays 26 in directions transverse to the laser beam axis 12. Diffusion bonding is well known in the industry. It produces a bond that is as strong as the host crystal and which provides a good optical, mechanical and thermal interface. The disclosed invention preferably uses pumping in directions transverse to the laser beam axis 12, i.e., edge-pumping or side-pumping, although it could also be used with other pumping methods. Edge-pumping implies that pumping is accomplished from a narrow side (edge) of the slab, and not from a wide face of a slab, such as a top or bottom side.

The outer cylindrical focusing surfaces 18 on the top and bottom cladding layers 46, 48 of the undoped cladding layer 14 are preferably aligned longitudinally with the laser axis 12 and designed with a concave hyperboloid or near-hyperboloid cylindrical shape to more uniformly distribute the transverse pump light within the active region 16. Each cylindrical focusing surface 18 has its optical line focus 20 outside the laser pump cavity 10, as shown in FIG. 1, one above and the other below the laser pump cavity 10. The cylindrical focusing surfaces 18 are preferably coated to ensure high reflectivity at the pump wavelength. The outer cylindrical focusing surfaces 18 are preferably covered with a compliant thermal interface material 22 and each cold plate 24 preferably has a cylindrical surface 45 placed adjacent to the thermal interface 22, which closely conforms to the shape of the cylindrical focusing surface 18, thereby facilitating thermal flow from the active region 15 to the cold plates 24. Heat is extracted from the doped laser crystal slab active lasing region 16 by conduction through the undoped cladding layer 14 and through the thermal interface 22 to the cold plate 24. The thermal interface 22 is preferably made of gold or indium metal foil and the cold plate 24 of an aluminum or copper alloy.

The pumplight is emitted by the laser diode arrays 26, available commercially, which preferably have integral cylindrical microlenses 28 that act to collimate the pumplight from each diode bar in a direction normal to the emitting surface. The collimated pumplight from each laser diode array 26 is then focused by a large cylindrical lens 30 so that the converging rays of pumplight 32, after being refracted at an entrance surface of the pump cavity 34, are directed toward the line foci of the cylindrical focusing surfaces 20. The entrance surface of the laser pump cavity 34 is coated with material which has antireflection properties at the pump wavelength, for the predetermined range of incidence angles, to maximize transmission of the pumplight into the laser pump cavity 10.

In the illustrative embodiment, principal rays of pumplight 32, which are focused at one of the line foci of cylindrical focusing surfaces 20, are reflected, by the non-corresponding cylindrical focusing surface 18, toward the other line focus 20, and this reflecting process is repeated with both cylindrical focusing surfaces 18, thus trapping substantially all of the pumplight within the laser pump cavity 10 until it is substantially absorbed. Although paraxial rays are not perfectly trapped, the absorption efficiency for paraxial rays over the total path length is high. The overall pumping efficiency of the laser pump cavity 10 is therefore very high, and depends on the absorption of the undoped cladding layer 14, the quality of the high reflectivity coatings on the cylindrical focusing surfaces 18, and the quality of the antireflection coatings at the entrance surfaces of the pump cavity 34.

The absorption efficiency may be further improved by reducing parasitic lasing and amplified spontaneous emission losses, which may be suppressed by doping the undoped cladding layers 14 with an ion that absorbs at the lasing wavelength, yet is highly transmissive at the pump wavelength. For example, $U^{4+}$ doped YAG crystal will transmit at the pump wavelength of the Yb:YAG laser (941 nm) and absorb at the lasing wavelength (1029 nm).

For implementations requiring low f/number pumping, it may be advantageous to shape and/or coat the entrance surface(s) at the side edges of the pump cavity 34 to maximize transmission and avoid critical angle limitations.

Figure 2:
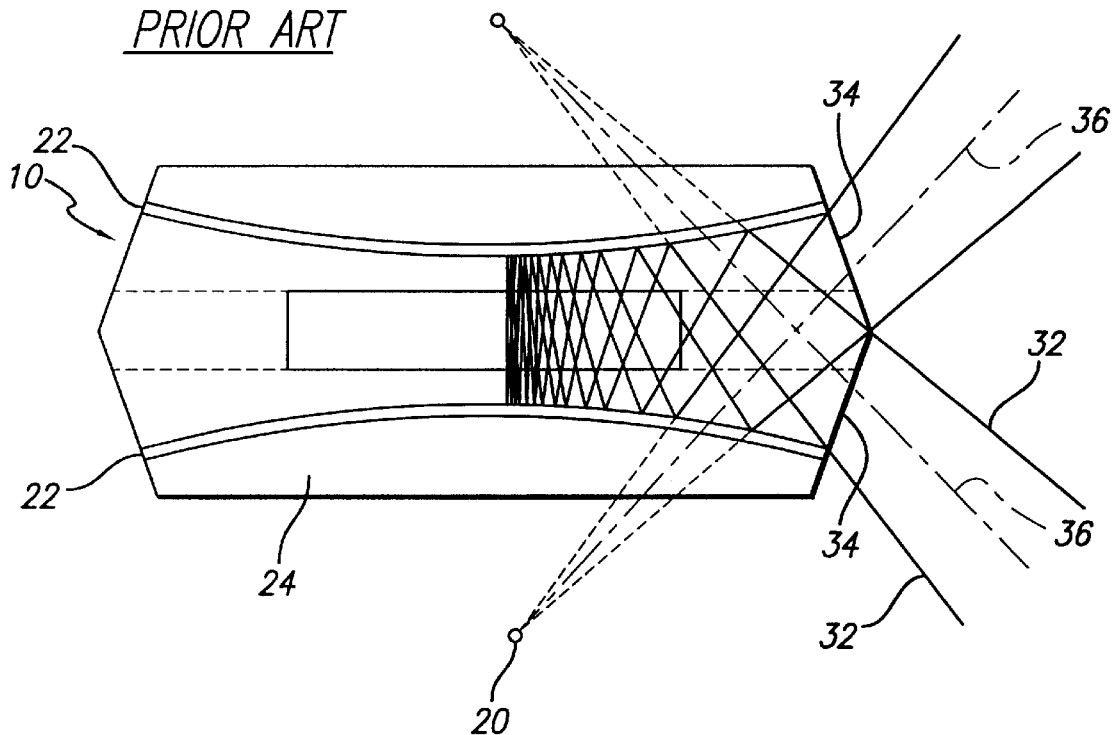
FIG. 2 is a plan view schematic illustration of a slab laser pump cavity apparatus with an integral concentrator designed for low f/number pumping in accordance with the teachings of the above-referenced '064 application.

FIG. 2 is a plan view schematic illustration of a slab laser pump cavity apparatus with an integral concentrator designed for low f/number pumping, in accordance with the teachings of the above-referenced '064 application. This embodiment, instead of one entrance surface to the pump cavity 34 on each side, has two touching, slanted entrance surfaces of the pump cavity 34 on each side. The precise angle of the entrance surface of the pump cavity 34 is selected according to the application and is based on a tradeoff between pumping efficiency and suppression of lateral parasitic lasing modes. The lateral parasitic lasing modes can reduce the stored energy in a Q-switched application or compete with the desired lasing process along the laser beam axis 12 in continuous or long-pulse applications.

Unfortunately, as mentioned above, the approach described in the '064 application requires a cladding layer formed in a hyperbolic cylindrical shape that is thicker at the edge of the slab than in the center to obtain the proper optical concentrator performance. If the outer surface of the cladding layer is cooled to a constant heat sink temperature, the difference in thermal conductance across the width of the slab due to the change in the cladding thickness produces a nonuniform temperature gradient within the slab. This, in turn, introduces nonuniform thermal lensing and stress birefringence, which are difficult to compensate.

In addition to improving pump efficiency and uniformity, it is essential to efficiently remove the large amount of heat that is generated within the lasing medium. An increase in the operating temperature within the lasing medium reduces the population inversion that can be achieved for a given level of pumping, thereby reducing efficiency. Reducing the operating temperature of the laser increases the gain and extraction efficiency. More specifically, reducing the operating temperature increases the stimulated emission cross-section of the active lasing medium. This lowers the saturation fluence of the active lasing region, which makes it easier to extract the stored energy for gain-switched and Q-switched systems without damaging the optical coatings at the exit surfaces or the bulk lasing material. Similarly, reducing the temperature also lowers the saturation intensity, which makes it easier to extract power for continuous and high pulse rate systems without optical damage.

Temperature gradients cause mechanical stress within the lasing medium. When the medium is stressed, the crystal becomes birefringent, and energy in the laser beam if polarized in a direction that is neither along nor orthogonal to the stress gradient will be converted from the desired polarization to an undesired polarization as the beam propagates along the beam axis through the crystal. This induced birefringence is undesirable for many applications. For example, when the crystal faces are cut at the Brewster angle to extract energy of a desired polarization, energy converted to an orthogonal polarization will be internally reflected, resulting in a loss of output efficiency.

As another example, in a typical multi-pass master oscillator power amplifier laser system that uses a straightforward polarizer and 90° polarization rotation means to separate the master oscillator input beam from the amplified output beam, depolarization of the beam due to thermal stress induced birefringence will cause a portion of the output beam to feed back into the master oscillator, potentially damaging the oscillator components, reducing the output power, and imprinting on the output beam a nonuniform intensity profile which adversely affects beam quality. It is therefore desirable to maintain a one-dimensional temperature gradient within the slab and orient the polarization of the beam to be collinear with or orthogonal to this gradient in order to avoid depolarization due to thermal stress birefringence. Temperature gradients also cause refraction or bending of the laser beam as it enters, propagates through, and exits the lasing medium. Physical distortion of the lasing medium due to nonuniform thermal expansion produces a lensing effect at the entrance and exit surfaces of the lasing medium. The index of refraction of the medium, which is a function of both the temperature and stress within the medium, varies across the beam producing graded-index lensing within the medium. If the temperature gradient is one dimensional within the slab, i.e. isotherms arc parallel to slab faces, the thermal lensing effects can be compensated by means available in the present art. For example, conventional cylindrical lenses can be used to provide a first order correction.

Also, the beam can be propagated in a zig-zag path via total internal reflection at the faces of the slab as first proposed by Martin and Chernoch in U.S. Pat. No. 3,633, 126, issued in 1972, (the teachings of which are incorporated herein by reference) so that the optical path length for all rays within the laser beam is the same thereby canceling the thermal lensing effect.

The beam can also be guided by total internal reflection at the faces, as described in the above-mentioned co-pending applications, minimizing the beam spreading within the slab. It is, therefore, desirable to maintain a one-dimensional temperature gradient within the slab in order to permit thermal lensing compensation by available methods.

In side-pumped laser cavity configurations, heat is removed from the lasing medium by cooling mechanisms applied to the broad faces of the slab. Prior art methods for cooling the broad slab faces include air cooling, liquid cooling systems (forced convection and impingement) and conductive cooling through metal heat sinks. Air cooling is limited to lower power lasers due to relatively poor thermal transfer. Liquid cooling requires careful sealing arrangements to prevent leakage that would contaminate the diode pump arrays and associated relay optics and cause optical damage to surfaces exposed to the laser beam.

Similarly, the performance of prior art methods that utilize direct contact of metal heat sinks to the solid state pump cavity medium has been less than desirable. Differences between the thermal conductivity and thermal expansion coefficients of the metal and solid-state pump cavity medium result in inadequate thermal transfer rates and significant mechanical stress. The above-mentioned co-pending applications describe a composite slab structure with top and bottom cladding layers that are diffusion bonded to the slab-shaped active lasing region. These cladding layers are shaped having outer cylindrical optical focusing surfaces, which concentrate the pumplight entering from the edge of the composite slab, thereby providing efficient and uniform pumping across the slab.

Because the thickness of the cladding layers varies across the slab, direct cooling of the slab through the outer cylindrical focusing surfaces, either by liquid or solid conductive means, wherein the cooling surface is maintained at a constant temperature, produces a non-uniform temperature gradient across the active lasing region resulting in a non-uniform thermal tensing and birefringence condition which is difficult to correct externally. Edge cladding regions may be used to improve the optical performance of the concentrator adding to the efficiency and uniformity of pumping. These edge-cladding regions, however, provide a thermal conduction path through the edges of the slab that exacerbates the non-uniform temperature gradient near the ends of the slab active lasing region.

Thus, there was a need for improved methods and apparatus for cooling a slab laser and controlling the direction of heat flow within the lasing medium to increase operating efficiency and minimize thermally-induced birefringence and lensing. This need was addressed by the '508 application. The '508 application provides a solution to the temperature nonuniformity problem by adding thermal resistance between the slab and the heat sink through a variable thickness compliant thermal interface layer between the cladding surface and the cold plat heat sink. This is illustrated in FIG. 3.

Figure 3:
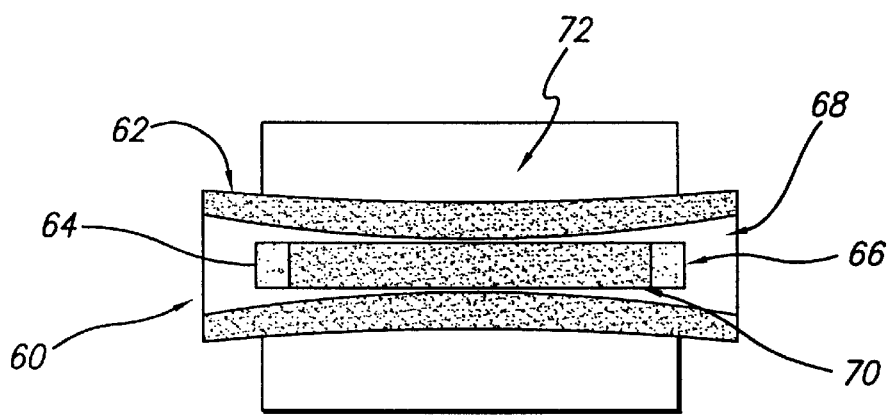
FIG. 3 is an end view of a composite slab laser pump cavity with hyperbolic concentrator implemented in accordance with the teachings of the '508 application.

FIG. 3 is an end view of a composite slab laser pump cavity with hyperbolic concentrator 60 implemented in accordance with the teachings of the '508 application. This system improves on the design of the '064 application by the addition of a variable thickness compliant thermal interface 62 which compensates for the thermal resistance of the nonuniform cladding layer 68. In addition, two diffusion bonded layers of doped host material 64 and 66 are added which act to extend the region of uniform heating, thereby displacing the area where fringing effects dominate the heat flow away from the active lasing region 70. A narrow cold plate heat sink 72 is added that extends over the active lasing region 70 and absorbing regions 64 and 66 of the slab to minimize thermal fringing at the slab ends.

Unfortunately, as mentioned above, a problem arises with this approach at high pumping levels in that the total temperature drop across the cladding and thermal interface layers can be quite large, resulting in high temperatures within the active lasing region of the slab. For quasi-four level laser media such as Yb:YAG, the gain (stimulated emission cross-section) of the medium decreases rapidly with temperature due to thermal population of the lower lasing level, degrading the performance of the laser. Also, thermal conductivity of materials such as YAG decreases with temperature, exacerbating the temperature rise problem.

Hence, a need remains in the art for a system or method for improving the performance of pumping arrangements for slab lasers. More specifically, a need remains in the art for a system or method for reducing the temperature drop across the cladding layers of side and end pumped high energy slab lasers to improve the thermal conductivity between the lasing medium and the heat sink thereof. As discussed more fully below, the need in the art is addressed by the concentrator and method of the present invention.

The present invention replaces the hyperbolic (or quasi-hyperbolic) cylindrical surfaces formed on the top and bottom cladding layers, as described above, with a Fresnel or binary optic surface that is also designed to concentrate the pumplight near he center of the slab such that the loss in pump power due to absorption is approximately offset by the higher concentration of rays near the center of the slab. The inventive concentrator includes a volume of at least partially transmissive material and a plurality of facets disposed at at least one surface of the material. Each of the facets is disposed at a position-dependent angle relative to the surface effective to cause an internal reflection of energy applied to the layer whereby the density of the applied energy varies as a function of position. In the illustrative implementation, the volume is an active medium, i.e., a slab. The slab has substantially parallel, planar upper and lower surfaces and first and second edges therebetween. A plurality of cladding layers are disposed on the upper and lower surfaces of the slab. The facets are provided in the cladding layers on the upper and lower surfaces of the slab and angled as a function of distance relative to the first or the second edge. The facets provide a Fresnel reflecting surface or a binary optic surface. The Fresnel or binary optic surface can be made thinner than the hyperbolic surface thereby minimizing the thermal resistance across the width of the slab.

Figure 4:
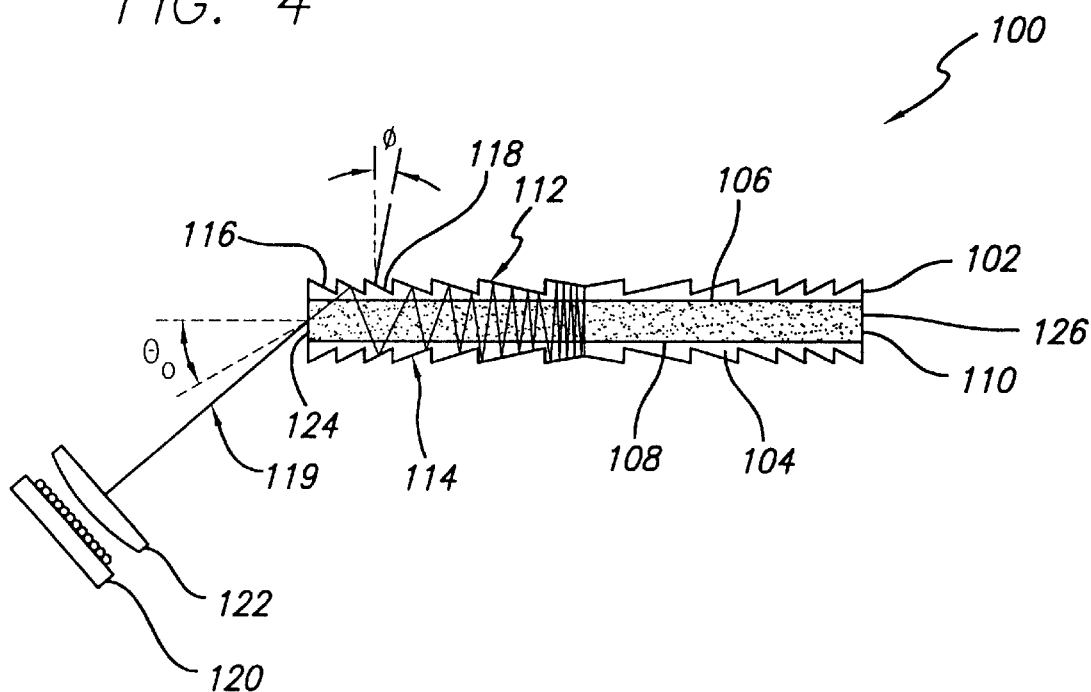
FIG. 4 is a simplified end view of an illustrative embodiment of a composite slab laser pump cavity with integrated concentrator implemented in accordance with the teachings of the present invention.

FIG. 4 is a simplified end view of an illustrative embodiment of a composite slab laser pump cavity with integrated concentrator implemented in accordance with the teachings of the present invention. The composite slab laser pump cavity with fresnel concentrator 100 is fabricated by diffusion bonding first and second cladding layers 102 and 104 to the top and bottom faces 106 and 108, respectively, of a high aspect ratio active lasing region 110. The active lasing region 110 may be a crystalline material such as yttrium aluminum garnet (YAG) that is doped with an active ion such as neodymium (Nd:YAG) or ytterbium (Yb:YAG). The cladding layers 102, 104 may be the same crystalline material as the active lasing region 110 without the doping such as undoped YAG, as shown.

As an alternative, the cladding layers may be a different optically transparent material such as sapphire as described in the above-referenced '226 application. In this case, refraction at the interface between the active lasing region 110 and the cladding layers must be accounted for. Furthermore, if the refractive index of the active lasing region 110 and cladding layers is different, the internal injection angle must be large enough to prevent total internal reflection at the cladding interface.

The composite slab structure may have the shape of a right rectangular cylinder. Alternatively, the end surfaces of the composite slab structure may be fabricated with the surface normal at an angle other than 90° to the longitudinal axis of the slab. For example, the end surfaces may be fabricated at the Brewster angle to minimize Fresnel loss for a linearly polarized laser beam. Also, the slab may be fabricated with a taper or other complex shape along the longitudinal axis, which may be advantageous for certain amplifier applications where high gain or high extraction efficiencies are required. Furthermore, the composite slab may be fabricated with a powered or unpowered optical surface at its edge to facilitate efficient pumplight coupling, as discussed below.

In accordance with the present teachings, first and second Fresnel or binary optic surfaces 112 and 114 are fabricated on the surfaces of the first and second cladding layers 102 and 104. The Fresnel or binary optic surfaces may be implemented by fabricating a number of facets in the cladding layers 102 and 104 using techniques well-known in the art, such as grinding and polishing, lithographic chemical etching, or diamond machining. The facets (e.g. 116, 118, etc.) are provided in the cladding layers on the upper and lower surfaces of the slab and angled as a function of distance relative to the first or the second edge to effect a concentration of pump energy to compensate for losses therein as discussed more fully below.

In operation, as per the conventional implementation depicted in FIG. 1, pump energy is supplied by a plurality of commercially available semiconductor laser diode arrays 120. Four banks of diode arrays may be used to provide symmetric pumping from both sides of the slab (note, only one of the four banks is shown in FIG. 4). The pumplight rays 119 from the individual diode bars in the diode pump array 120 are first collimated in the fast axis by cylindrical microlenses (not shown) and then focused by a cylindrical lens 122 onto the edge 124 of the slab 100. The pumplight rays 119 enter the slab 100 and are refracted at the air to crystal interface. Each refracted ray then propagates toward one of the surfaces 112 at an internal injection angle 116, $\theta_0$, with respect to the normal to the entrance surface. The ray is then reflected by the surface 112 toward the opposing surface 114. The facet angle, $\phi$, is a function of position from the edge of the slab and the reflected ray obeys the law of reflection at surface of the facet.

The active lasing region 110 is uniformly doped with an absorbing species with a bulk absorption coefficient, $\alpha_m$. Pumplight energy is absorbed as the rays traverse the active lasing region 110 which (1) adds to laser gain in the medium and (2) causes the pumplight ray to lose energy. In accordance with the present teachings, the angles $\phi$ of the facets of each Fresnel or binary optic surface 112 and 114 are tailored from the edge to the center of the slab to increase the ray (energy) density to offset the loss in ray intensity to provide a uniform distribution of laser gain within the active lasing region 110 across the width of the slab 100.

In the illustrative embodiment, the facet angles as a function of distance relative to the slab edge are approximated in accordance with the following relation:

$$\phi(x)=0.5\alpha_m^2 t\, x_{max}(1-x/x_{max})/[1-\alpha_m^2 x_{max}^2(1-x/x_{max})^2] \quad [1]$$

where:

$\phi(x)$=facet angle as a function of distance from slab edge (radians);

$\alpha_m$=bulk absorption coefficient (cm$^{-1}$)=$\alpha_m$=cos $\theta_0/x_{max}$;

$\theta_0$=internal injection angle (radians);

t=slab thickness (cm); and $x_{max}$=distance from edge of active region to center of slab (cm).

Note, equation [1] is a first-order approximation, not an optimized design.

In practice, the optimal shape of each Fresnel or binary optic surface 112, 114 may found by one of ordinary skill in the art using a conventional geometrical optical ray tracing program through an iterative design process that begins with the bulk absorption coefficient and facet angle versus distance relationships given by the above equations. For example, an optical ray trace code such as ASAP may be used to predict the distribution of absorbed power within a finite volume grid representing the slab. One of ordinary skill in the art will be able to make the necessary modifications without undue experimentation.

Second order effects such as Fresnel reflection at the cladding interface, reflectivity of the Fresnel or binary optic surface, scattering at facet discontinuities, and the distribution of internal injection angles from a focused pumplight beam may also be modeled in the computer code by one of ordinary skill in the art without undue experimentation. Optimization is achieved when the modeling shows the best combination of absorption efficiency and gain uniformity for a specific laser design application.

Figure 5:
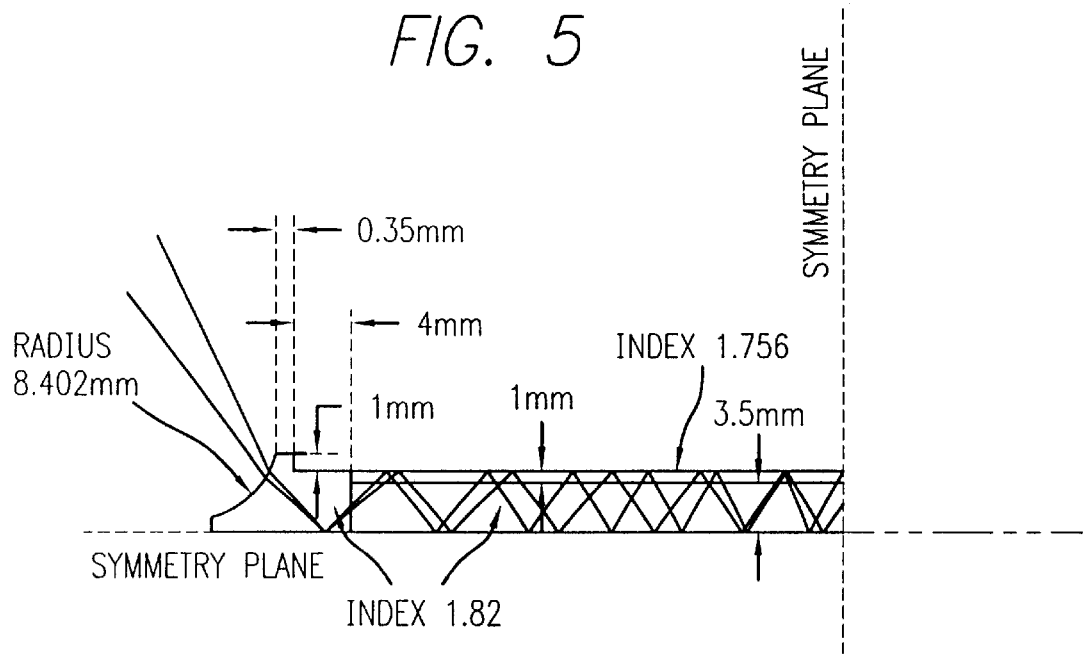
FIG. 5 is a schematic diagram showing an illustrative implementation of a composite slab laser pump cavity with integrated concentrator in accordance with the teachings of the present invention.

FIG. 5 is a schematic diagram showing an illustrative implementation of a composite slab laser pump cavity with integrated concentrator in accordance with the teachings of the present invention. Illustrative design parameters are provided below.

| | | |
|---|---|---|
| composite slab thickness: | (t) = | 0.9 cm |
| thickness of active lasing region: | ($t_g$) = | 0.7 cm |
| width of active lasing region: | ($2x_{max}$) = | 14 cm |
| bulk absorption coefficient: | ($\alpha_m$) = | 0.14 cm$^{-1}$ |
| internal injection angle: | ($\theta_o$) = | 45 degrees |

The shape of the illustrative pump cavity design is shown in FIG. 5, which shows only one quadrant of the structure. It is modeled with a reflecting surface at the two symmetry planes to minimize file size and run time.

Table 1 lists the surface segment tilts for each Fresnel segment of the illustrative embodiment starting at the outside edge of the absorbing region and ending in the center of the slab active lasing region. For this design, there are 85 surface segments over a half slab-width of 70 mm.

TABLE 1

Surface Segment Tilt for each Fresnel Surface Segment

| Segment | Tilt (deg) |
|---|---|
| 1 | 3.3196 |
| 2 | 3.1116 |
| 3 | 2.9257 |
| 4 | 2.7585 |
| 5 | 2.6072 |
| 6 | 2.4697 |
| 7 | 2.3441 |
| 8 | 2.2290 |
| 9 | 2.1230 |
| 10 | 2.0251 |
| 11 | 1.9343 |
| 12 | 1.8500 |
| 13 | 1.7714 |
| 14 | 1.6979 |
| 15 | 1.6290 |
| 16 | 1.5643 |
| 17 | 1.5035 |
| 18 | 1.4461 |
| 19 | 1.3918 |
| 20 | 1.3405 |
| 21 | 1.2918 |
| 22 | 1.2455 |
| 23 | 1.2015 |
| 24 | 1.1596 |
| 25 | 1.1196 |
| 26 | 1.0814 |
| 27 | 1.0448 |
| 28 | 1.0097 |
| 29 | 0.97613 |
| 30 | 0.94386 |
| 31 | 0.91283 |
| 32 | 0.88296 |
| 33 | 0.85418 |
| 34 | 0.82643 |
| 35 | 0.79963 |
| 36 | 0.77373 |
| 37 | 0.74868 |
| 38 | 0.72443 |
| 39 | 0.70092 |
| 40 | 0.67813 |
| 41 | 0.65599 |
| 42 | 0.63449 |
| 43 | 0.61359 |
| 44 | 0.59324 |
| 45 | 0.57342 |
| 46 | 0.55411 |
| 47 | 0.53527 |
| 48 | 0.51688 |
| 49 | 0.49892 |
| 50 | 0.48136 |
| 51 | 0.46418 |
| 52 | 0.44736 |
| 53 | 0.43089 |
| 54 | 0.41474 |
| 55 | 0.39890 |
| 56 | 0.38335 |
| 57 | 0.36808 |
| 58 | 0.35307 |
| 59 | 0.33830 |
| 60 | 0.32377 |
| 61 | 0.30946 |
| 62 | 0.29536 |
| 63 | 0.28145 |
| 64 | 0.26773 |
| 65 | 0.25419 |
| 66 | 0.24081 |
| 67 | 0.22758 |
| 68 | 0.21450 |
| 69 | 0.20155 |
| 70 | 0.18873 |
| 71 | 0.17603 |
| 72 | 0.16343 |
| 73 | 0.15094 |
| 74 | 0.13853 |
| 75 | 0.12621 |
| 76 | 0.11396 |
| 77 | 0.10179 |
| 78 | 0.089672 |
| 79 | 0.077609 |
| 80 | 0.065592 |
| 81 | 0.053614 |

TABLE 1-continued

Surface Segment Tilt for each Fresnel Surface Segment

| Segment | Tilt (deg) |
|---------|------------|
| 82 | 0.041667 |
| 83 | 0.029745 |
| 84 | 0.017840 |
| 85 | 0.059454 |
| center | |

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A solid state laser comprising:
    a composite active medium, pump cavity and concentrator including:
        a volume of at least partially transmissive material and
        a plurality of facets disposed at at least one surface of said material, each of said facets being disposed at a position dependent angle relative to said surface effective to cause an internal reflection of energy applied to said layer whereby the density of said applied energy varies as a function of position and
    means for pumping energy into said cavity.

2. The invention of claim 1 wherein said volume is an active medium.

3. The invention of claim 2 wherein said active medium is a slab.

4. The invention of claim 3 wherein said slab has substantially parallel, planar upper and lower surfaces and first and second edges therebetween.

5. The invention of claim 4 further including a plurality of cladding layers disposed on said upper and lower surfaces of said slab.

6. The invention of claim 5 wherein said facets are provided in said cladding layers on said upper and lower surfaces of said slab and angled as a function of distance relative to said first or said second edge.

7. The invention of claim 6 wherein said facets comprise a Fresiel reflecting surface.

8. The invention of claim 6 wherein said facets comprise a binary optic surface.

9. The invention of claim 6 wherein the facet angles as a function of distance relative to a slab edge are:

$$\phi(x) = 0.5\alpha_m^2 t\, x_{max}(1-x/x_{max})/[1-\alpha_m^2 x_{max}^2(1-x/x_{max})^2]$$

where:

$\alpha_m$=bulk absorption coefficient (cm$^{-1}$)=$\alpha_m$=cos $\theta_0/x_{max}$;

$\theta_0$=internal injection angle (radians);

$\phi(x)$=facet angle as a function of distance from slab edge (radians);

t=slab thickness (cm); and $x_{max}$=point at which 100% of pumplight is absorbed, i.e., center of slab (cm).

10. The invention of claim 5 wherein said slab is yttrium aluminum garnet doped with an active ion.

11. The invention of claim 5 wherein said cladding is undoped yttrium aluminum garnet.

12. The invention of claim 5 wherein said slab is tapered and said facets are tapered proportionately with respect thereto.

* * * * *